United States Patent
Miura et al.

(10) Patent No.: US 9,243,713 B2
(45) Date of Patent: Jan. 26, 2016

(54) SEALING STRUCTURE (71) Applicant: HONDA MOTOR CO., LTD., Tokyo (JP)

(72) Inventors: Taneaki Miura, Wako (JP); Hiroyasu Ozaki, Wako (JP); Koichi Takaku, Wako (JP); Koichi Kato, Wako (JP); Saneto Asano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 13/623,391

(22) Filed: Sep. 20, 2012

(65) Prior Publication Data

US 2013/0069362 A1 Mar. 21, 2013

(30) Foreign Application Priority Data

Sep. 20, 2011 (JP) .................. 2011-204467

(51) Int. Cl.
*F16J 15/16* (2006.01)

(52) U.S. Cl.
CPC ..................... *F16J 15/166* (2013.01)

(58) Field of Classification Search
CPC ........... F16J 15/16; F16J 15/166; F16J 15/48; F16L 17/06
USPC ....................... 403/36–39, 288; 285/347, 348; 277/584, 611, 638
See application file for complete search history.

(56) References Cited

U.S. PATENT DOCUMENTS

| | | | |
|---|---|---|---|
| 2,420,104 A | 5/1947 | Smith | |
| 2,462,586 A * | 2/1949 | Whittingham | ................ 277/452 |
| 2,961,278 A * | 11/1960 | Newhall | ........................... 92/206 |
| 3,004,783 A | 10/1961 | Webb | |
| 3,094,337 A * | 6/1963 | Pippert et al. | ................. 277/638 |
| 3,144,162 A * | 8/1964 | Morris | .......................... 220/378 |

(Continued)

FOREIGN PATENT DOCUMENTS

| | | |
|---|---|---|
| EP | 1 950 472 A1 | 7/2008 |
| JP | H01-165856 A | 11/1989 |

(Continued)

OTHER PUBLICATIONS

Japanese Notice of Reason for Rejection from Japan Patent Office application No. 2011-204467 dated Aug. 6, 2013.

(Continued)

*Primary Examiner* — Joshua Kennedy (74) *Attorney, Agent, or Firm* — Squire Patton Boggs (US) LLP (57) ABSTRACT

A sealing structure permits easy fitting of the insertion member into the reception member and that prevents damage to the insertion member and the reception member.

The insertion member includes a first larger-diameter columnar portion, a first smaller-diameter columnar portion, and a first step portion.

The reception member includes a second larger-diameter cylindrical portion, a second smaller-diameter cylindrical portion, and a second step portion.

An accommodation region for accommodating an O-ring is defined by an outer circumferential surface of the first smaller-diameter columnar portion, an outer surface of the first step portion, an inner circumferential surface of the second larger-diameter cylindrical portion, and an inner surface of the second step portion.

3 Claims, 7 Drawing Sheets

(56) References Cited

U.S. PATENT DOCUMENTS

| | | | |
|---|---|---|---|
| 3,514,132 A | | 5/1970 | Peabody |
| 3,767,215 A | * | 10/1973 | Brown .......................... 277/638 |
| 3,888,496 A | * | 6/1975 | Dryer ........................... 277/619 |
| 4,079,948 A | * | 3/1978 | Paureau ........................ 277/587 |
| 4,556,227 A | | 12/1985 | Sato et al. |
| 4,572,239 A | * | 2/1986 | Koch et al. ............... 137/625.47 |
| 6,758,478 B1 | * | 7/2004 | Moreno ........................ 277/584 |
| 7,434,849 B2 | * | 10/2008 | Takeuchi et al. .............. 285/347 |
| 7,793,944 B2 | * | 9/2010 | Otuka ........................... 277/611 |
| 7,828,301 B2 | | 11/2010 | Briscoe et al. |
| 7,900,934 B2 | * | 3/2011 | Kanagae ....................... 277/584 |
| 7,900,935 B2 | * | 3/2011 | Kanagae ....................... 277/584 |
| 2005/0046187 A1 | | 3/2005 | Takeuchi et al. |
| 2013/0069321 A1 | * | 3/2013 | Miura et al. .................. 277/638 |

FOREIGN PATENT DOCUMENTS

| | | | |
|---|---|---|---|
| JP | 03129192 A | * 6/1991 | .............. F16L 21/08 |
| JP | 2002-161983 A | 6/2002 | |
| JP | 3543617 B2 | 4/2004 | |
| JP | 2008-304012 A | 12/2008 | |

OTHER PUBLICATIONS

U. S. Office Action U.S. Appl. No. 13/623,372 dated Aug. 23, 2013.
European Search Report application No. 12185151.3 dated Nov. 27, 2012.

* cited by examiner

SEALING STRUCTURE

CROSS-REFERENCE TO RELATED APPLICATION

This application claims the foreign priority benefit under 35 U.S.C. §119 of Japanese Patent Application No. 2011-204467 filed on Sep. 20, 2011, the disclosure of which is incorporated herein by reference.

BACKGROUND OF THE INVENTION

1. Field of the Invention

The present invention relates to a sealing structure using an O-ring for preventing fluid leakage.

2. Description of the Invention

Various sealing structures have been developed to prevent leakage of hydrogen from a hydrogen tank (storage body) mounted in a fuel cell vehicle that stores high pressure hydrogen inside or prevent leakage of oil from a section of a hydraulically-operated apparatus which makes reciprocating movement.

For example, the hydrogen tank has a cylindrical outer shape and has an end provided with a cylindrical connector portion (reception member) for a valve body (insertion member) to be inserted in. The connector portion has an inner circumferential surface with an inner threaded portion formed therein. The valve body has an outer circumferential surface with an outer threaded portion formed thereon. When the connector portion is fitted into the valve body by engaging those portions with each other, an annular accommodation region is formed for accommodating an O-ring to prevent leakage of hydrogen from the hydrogen tank. Further, in some cases, a back-up ring or rings are fitted inside the accommodation region to prevent damage to the O-ring caused by the O-ring being caught in a clearance between the connector portion and the valve body.

Japanese Patent No. 3543617 discloses a sealing device including a shaft (insertion member), a shaft hole (reception member), a sealing ring (O-ring), a back-up ring. An annular attachment groove is formed in either one of the shaft and the shaft hole with the sealing ring and the back-up ring fitted in the attachment groove. When a pressure is applied to the attachment groove from a higher pressure side, there is a clearance between an inner wall face, on a lower pressure side, of the attachment groove and a surface, on the lower pressure side, of the back-up ring. According to the sealing device of Japanese Patent No. 3543617, it is possible to prevent damage to the sealing ring and thereby favorably maintain sealing performances.

Japanese Unexamined Patent Application Publication No. 2002-161983 discloses a sealing device including a shaft (insertion member) and a housing (reception member) coaxially fitted with each other, two back-up rings, and a sealing ring (O-ring) sandwiched between the two back-up rings. The sealing ring and the back-up rings are fitted inside an annular attachment groove formed in either one of the shaft and the housing. Each back-up ring has a taper formed to come in total contact with and abut on each of tapers formed at both end portions of the attachment groove. According to the sealing device of Japanese Unexamined Patent Application Publication No. 2002-161983, it is possible to convert a pressure in the axial direction applied to each of the back-up rings into a radially outward force and a radially inward force to allow the back-up rings to fill in a clearance between the shaft and the housing and thereby prevent the O-ring from being caught in the clearance and being damaged.

In the sealing devices of Japanese Patent No. 3543617 and Japanese Unexamined Patent Application Publication No. 2002-161983, however, the annular attachment groove is formed only in either one of the insertion member and the reception member. Accordingly, there arises a problem that the insertion member and the reception member might collide with each other to be damaged when the insertion member is inserted into the reception member.

Figure 7A:
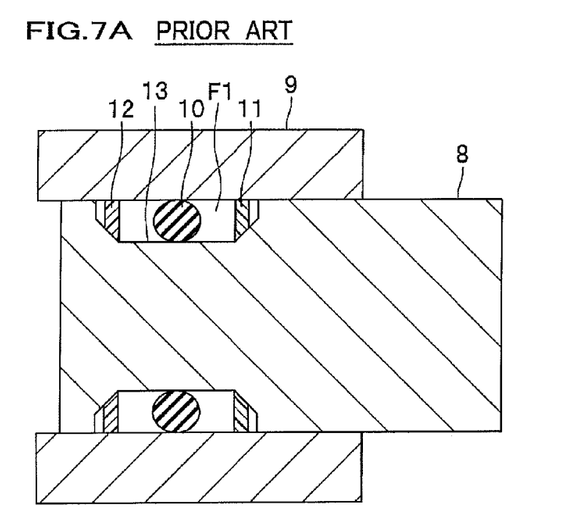
FIG. 7A shows a state in which the insertion member is fitted in the reception member.

For example, in the sealing device (sealing structure) of Japanese Unexamined Patent Application Publication No. 2002-161983, as shown in FIG. 7A, a shaft (insertion member) 8 has an annular attachment groove 13. An O-ring 10 and two back-up rings 11, 12 are fitted into the annular attachment groove 13 and then the shaft 8 is inserted into a housing (reception member) 9.

In general, the outer diameter of the shaft 8 is made slightly smaller than the inner diameter of the housing 9 in cross section in consideration of ease of fitting of the shaft 8 into the housing 9 and manufacturing errors. However, it is difficult to insert the shaft 8 into the housing 9 with the central axes of the shaft 8 and the housing 9 in complete alignment to prevent the collision of the shaft 8 with the housing 9.

Figure 7B:
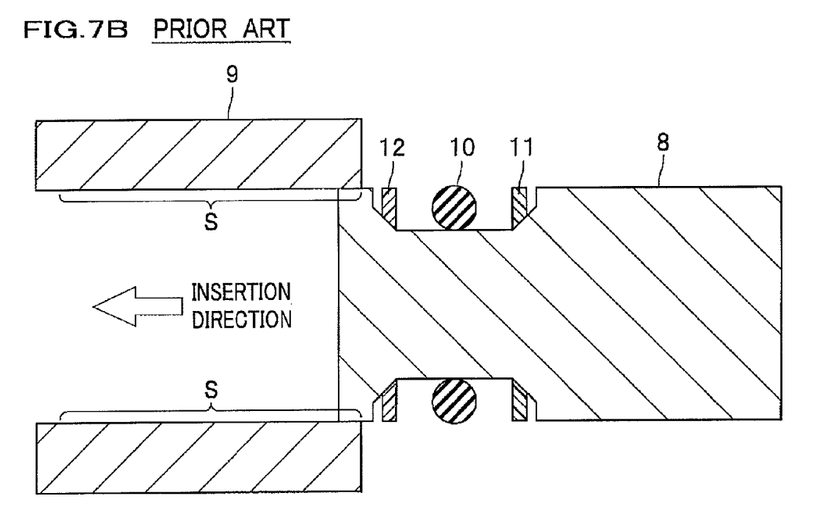
FIG. 7B is a state in which the insertion member is being inserted into the reception member.

That is, as shown in FIG. 7B, when the shaft 8 of the sealing device is fitted into the housing 9, there is a high risk of the collision of the outer circumferential surface of the shaft 8 with the inner circumferential surface S of the housing 9, resulting in damage to the outer circumferential surface of the shaft 8 and to the inner circumferential surface S of the housing 9, that is, damage to a portion of the inner circumferential surface S of the housing 9 that corresponds to an accommodation region FI for accommodating an O-ring 10. This will cause the problem of insufficient sealing of the clearance by the O-ring 10, resulting in fluid leakage.

It is an object of the present invention to provide a sealing structure that permits easy fitting of the insertion member into the reception member and that prevents damage to the insertion member and the reception member.

SUMMARY OF THE INVENTION

To solve the above problem, the present invention provides a sealing structure comprising:

an insertion member having a columnar outer shape;

a reception member having a cylindrical shape for receiving the insertion member, the reception member being formed integrally with a storage body for storing a fluid therein; and an O-ring disposed between the insertion member and the reception member for sealing a fluid in the storage body, wherein:

the insertion member includes a first larger-diameter columnar portion, a first smaller-diameter columnar portion, and a first step portion, the first smaller-diameter columnar portion being formed integrally with the first larger-diameter columnar portion and having an outer diameter smaller than an outer diameter of the first larger-diameter columnar portion, the first step portion being formed by a difference in diameter between the first larger-diameter columnar portion and the first smaller-diameter columnar portion, the reception member includes a second larger-diameter cylindrical portion, a second smaller-diameter cylindrical portion, and a second step portion, the second larger-diameter cylindrical portion having an inner diameter corresponding to the outer diameter of the first larger-diameter columnar portion, the second smaller-diameter cylindrical portion being formed integrally with the second larger-diameter cylindrical portion and having an inner diameter corresponding to the outer diameter of the first smaller-diameter columnar portion, the second step portion being formed by a difference in diameter between the second larger-diameter cylindrical portion and the second smaller-diameter cylindrical portion, and when the insertion member is fitted into and aligned coaxially with the reception member after an end of the first smaller-diameter columnar portion of the insertion member is kept opposed to an end of the second larger-diameter cylindrical portion of the first smaller-diameter columnar portion of the reception member, an accommodation region for accommodating the O-ring is formed by an outer circumferential surface of the first smaller-diameter columnar portion, an outer surface of the first step portion, an inner circumferential surface of the second larger-diameter cylindrical portion, and an inner surface of the second step portion.

With the above arrangement, when the insertion member is inserted into the reception member, the first smaller-diameter columnar portion of the insertion member first enters the space defined by the inner circumferential surface of the second larger-diameter cylindrical portion of the reception member. Here, the inner diameter of the second larger-diameter cylindrical portion of the reception member (an inner diameter L31 to be described later) is larger than the outer diameter of the first smaller-diameter columnar portion of the insertion member (an outer diameter L22 to be described later). Accordingly, the insertion member can be inserted easily into the reception member without the first smaller-diameter columnar portion of the insertion member contacting the inner surface of the second larger-diameter cylindrical portion of the reception member. That is, the outer circumferential surface of the first smaller-diameter columnar portion and the inner circumferential surface of the second larger-diameter cylindrical portion of the reception member are less likely to sustain damage.

When the insertion member is inserted further into the reception member from the above state, the O-ring is elastically deformed by being pressed into the gap between the outer circumferential surface of the first smaller-diameter columnar portion of the insertion member and the inner circumferential surface of the second larger-diameter cylindrical portion of the reception member. At this time, the magnitudes of the forces by which the outer circumferential surface of the first smaller-diameter columnar portion of the insertion member presses the O-ring in the outward radial directions of the O-ring are uniform throughout the O-ring's annular contact surface with the first smaller-diameter columnar portion. Likewise, the magnitudes of the forces by which the inner circumferential surface of the second larger-diameter cylindrical portion of the reception member presses the O-ring in inward radial directions of the O-ring are uniform throughout the O-ring's annular contact surface with the second larger-diameter cylindrical portion. The O-ring serves as a guide when the insertion member is inserted into the reception member. Accordingly, it is possible to easily fit the insertion member 2 into the reception member 3 and prevent damage to the outer circumferential surface of the insertion member and to the inner circumferential surface of the reception member.

Further, with the insertion member fitted in the reception member, the accommodation region for accommodating the O-ring is defined by the outer circumferential surface of the first smaller-diameter columnar portion, the outer surfaces of the first step portion, the inner circumferential surface of the second larger-diameter cylindrical portion, and the inner surfaces of the second step portion, and the O-ring is fitted inside the accommodation region. Here, as described above, damage to the outer circumferential surface of the insertion member and to the inner circumferential surface of the reception member is prevented. Accordingly, inside the accommodation region, the O-ring properly presses the outer circumferential surface of the insertion member inwardly in the radial direction while properly pressing the inner circumferential surface of the reception member outwardly in the radial direction, resulting in sealing of the clearance between the insertion member and the reception member. Consequently, it is possible to prevent fluid leakage caused by variations in the pressure from the tank.

Preferably, the sealing structure is configured so that it further comprises:

a first back-up ring disposed on a side of the insertion member inside the accommodation region for restricting movement of the O-ring in an axial direction of the accommodation region; and a second back-up ring disposed on a side of the reception member inside the accommodation region for restricting movement of the O-ring in the axial direction of the accommodation region, wherein:

the first back-up ring has a surface opposed to the outer surface of the first step portion and formed to come in total contact with the outer surface of the first step portion, and the second back-up ring has a surface opposed to the inner surface of the second step portion and formed to come in total contact with the inner surface of the second step portion.

With the above arrangement, the first back-up ring's surface opposed to the outer surfaces of the first step portion is formed to come in total contact with the outer surfaces of the first step portion. Accordingly, the first back-up ring makes close contact with the first step portion when the pressure inside the accommodation region becomes higher on the reception member side. Likewise, the second back-up ring's surface opposed to the inner surfaces of the second step portion is formed to come in total contact with the inner surfaces of the second step portion. Accordingly, the second back-up ring makes close contact with the second step portion when the pressure inside the accommodation region becomes higher on the insertion member side. Consequently, even when alternating pressures are applied, the back-up rings is deformed in correspondence with the applied alternating pressures to prevent the O-ring from being caught in the clearance between the insertion member and the reception member. Namely, damage to the O-ring can be prevented to ensure more proper sealing against fluid leakage.

Preferably, the sealing structure is configured so that:

the outer surface of the first step portion comprises a first taper face tapering down in a direction of insertion of the insertion member further into the reception member, and the inner surface of the second step portion comprises a second taper face tapering face tapering down in the direction of insertion of the insertion member further into the reception member.

With the above arrangement, when the pressure inside the accommodation region becomes higher on the reception member side, the first back-up ring is deformed along the first taper face, presses the first taper inwardly in the radial direction and presses the inner circumferential surface of the second larger-diameter cylindrical portion outwardly in the radial direction. Accordingly, the first back-up ring seals the clearance between the first back-up ring and the outer circumferential surface of the insertion member and the clearance between the first back-up ring and the inner circumferential surface of the reception member. Consequently, the O-ring can be prevented from being caught in the clearance and damaged to ensure more proper sealing against fluid leakage.

The same holds true for the effects of the second back-up ring in the case in which the pressure is high on the insertion member side.

Preferably, the sealing structure is configured so that:
the first step portion includes a first outer wall extending from the first taper face outwardly in the radial direction,
the second step portion includes a second inner wall extending from the second taper face inwardly in the radial direction, and
when the insertion member is fitted coaxially into the reception member, clearances are formed respectively between the first back-up ring and the first outer wall and between the second back-up ring and the second inner wall.

With the above arrangement, a gap is formed between the first back-up ring and the first outer wall. Accordingly, when the pressure becomes higher on the reception member side, the first back-up ring is moved toward the insertion member side by a predetermined distance according to the magnitude of the pressure. The movement of the first back-up ring is restricted by the shape of the first taper face (tapering down in a direction of insertion of the insertion member further into the reception member). The first back-up ring makes close contact with each of the first taper face and the inner circumferential surface of the second larger-diameter cylindrical portion to ensure improved sealing performances. The same holds true for the second back-up ring.

Preferably, the sealing structure is configured so that:
respective cross sectional areas of the O-ring, the first back-up ring and the second back-up ring taken along a plane including an axis that the insertion member and the reception member have in common when these members are coaxially fitted with each other, the outer diameter of the first smaller-diameter columnar portion, the inner diameter of the second larger-diameter cylindrical portion, and a length in the axial direction of the accommodation region are set so that a filling ratio of the O-ring in the accommodation region is not lower than a predetermined value.

With the above arrangement, even if an O-ring with a relatively high gas permeation coefficient is used, a filling ratio of the O-ring in the accommodation region is not lower than a predetermined value. As a result, only a reduced amount of the permeated gas is allowed to stay in a space between the O-ring and the first back-up ring or a space between the O-ring and the second back-up ring. Accordingly, the O-ring is prevented from being moved by the pressure of the permeated gas and pressed against either one of the first and second back-up rings on the lower pressure side, and damaged.

The present invention provides a sealing structure that permits easy fitting of the insertion member into the reception member and that prevents damage to the insertion member and the reception member.

BRIEF DESCRIPTION OF THE DRAWINGS

FIGS. 4A and 4B are cross sectional views of the sealing structure taken along the plane including the central axis.

FIGS. 6A-6D are partially enlarged views of the region T according to modifications of the present invention.

FIGS. 7A and 7B are cross sectional views of a conventional sealing structure.

DETAILED DESCRIPTION OF THE PREFERRED EMBODIMENT

Figure 1:
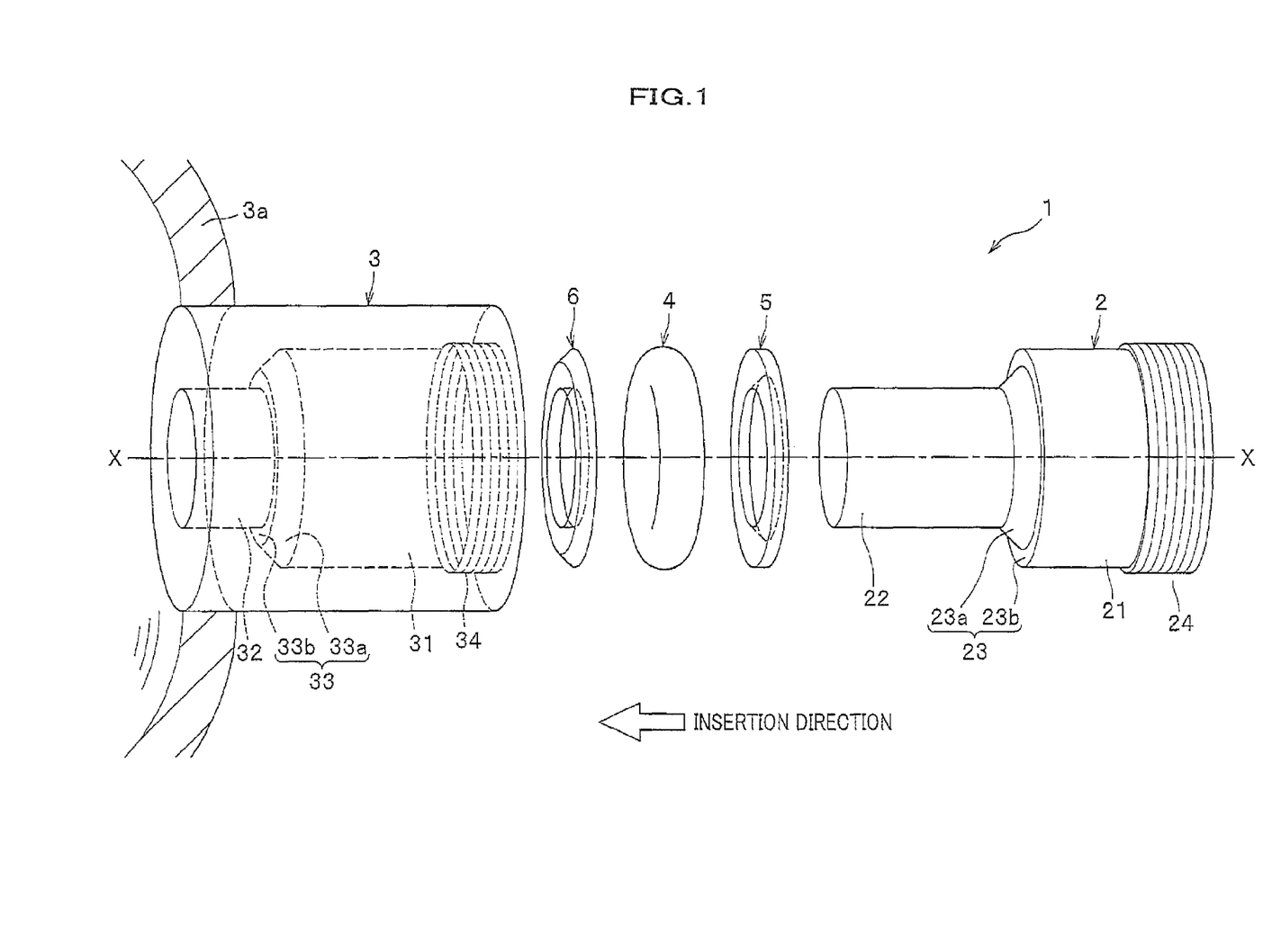
FIG. 1 is an exploded schematic view of a sealing structure according an embodiment of the present invention.
Figure 2:
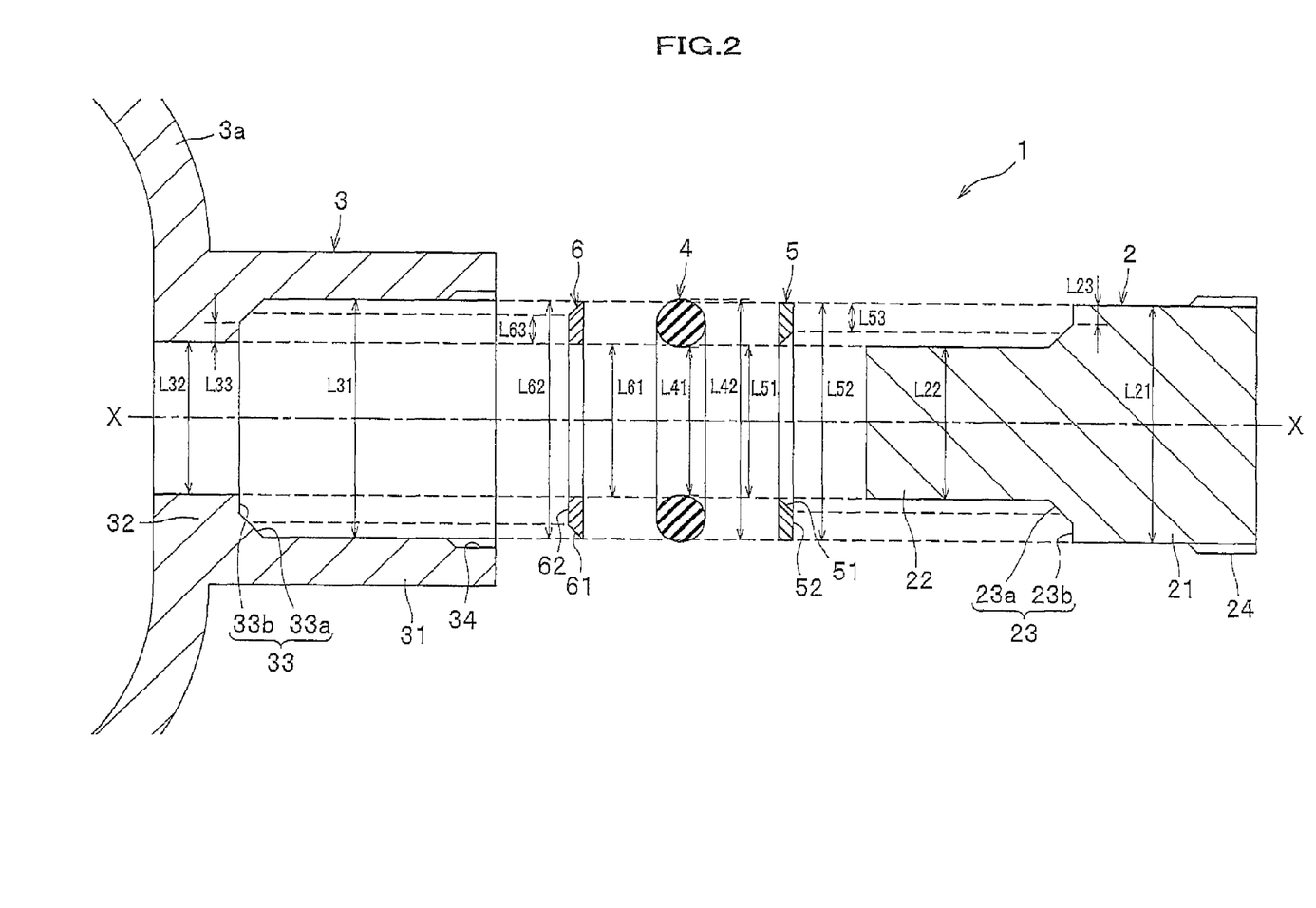
FIG. 2 is a cross sectional exploded view of the sealing structure taken along a plane including a central axis of the sealing structure.
Figure 3:
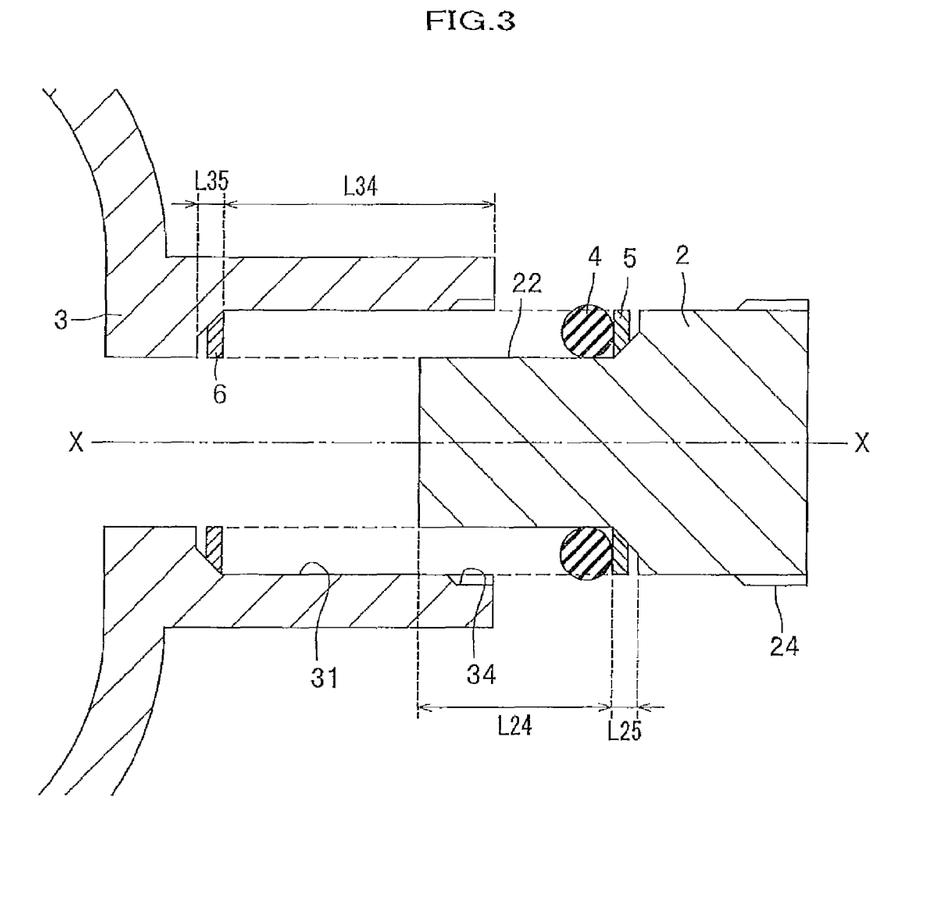
FIG. 3 is a cross sectional view of the sealing structure taken along the plane including the central axis, showing how a smaller-diameter cylindrical portion of an insertion member enters inside a space defined by an inner circumferential surface of a larger-diameter cylindrical portion of a reception member.

In the following paragraphs, an embodiment of the present invention will be described in detail with reference to FIGS. 1-6D. Like components are denoted by like reference numerals and detailed descriptions will be omitted. In FIGS. 1-3, for the sake of convenience, an O-ring 4 and first and second back-up rings 5, 6 are drawn to a larger scale than an insertion member 2 and a reception member 3.

<<Configuration of Sealing Structure>>

FIG. 1 is an exploded schematic view of a sealing structure according an embodiment of the present invention. FIG. 2 is a cross sectional view of the sealing structure taken along a plane including a central axis of the sealing structure. As shown in FIG. 1, a sealing structure 1 includes the insertion member 2, the reception member 3, the O-ring 4, the first back-up ring 5, and the second back-up ring 6.

The sealing structure 1 includes the connector portion (reception member 3) of, for example, a hydrogen tank (tank body 3a: see FIG. 1) and the valve body (insertion member 2) screw-engaged with the connector portion. The sealing structure 1 is for sealing a clearance formed when the connector portion is fitted into the valve body. The hydrogen tank supplies hydrogen to a fuel cell (not shown) where the hydrogen is reacted with oxygen between electrodes to generate electric power. The application of the sealing structure 1, however, is not limited the above example.

In the following paragraphs, "central axis X" refers to a central axis that the insertion member 2 and the reception member 3 have in common when these members are coaxially fitted with each other.

<Insertion Member>

As shown in FIG. 1, the insertion member 2 includes a larger-diameter columnar portion 21, a smaller-diameter columnar portion 22, and a step portion 23.

The larger-diameter columnar portion 21 (first larger-diameter columnar portion) has a columnar outer shape, and has an outer diameter L21 (see FIG. 2). The larger-diameter columnar portion 21 has, on an end thereof (one end opposite to the other that faces the reception member 3 when the insertion member 2 is fitted into the reception member 3), an outer threaded portion 24 for engaging the insertion member 2 with the reception member 3.

The smaller-diameter columnar portion 22 (first smaller-diameter columnar portion) has a columnar outer shape, is formed integrally with the larger-diameter columnar portion 21, and has an outer diameter L22 (see FIG. 2). Here, the outer diameter L21 of the larger-diameter columnar portion 21 is larger than the outer diameter L22 of the smaller-diameter columnar portion 22.

The step portion 23 (first step portion) is located between the larger-diameter columnar portion 21 and the smaller-diameter columnar portion 22, and is formed due to the difference in diameter therebetween. The step portion 23 has outer surfaces that are respectively a taper face 23a and an outer wall 23b.

The taper face 23a (first taper face) tapers down in the direction of insertion of the insertion member 2 further into the reception member 3 (in FIG. 1, to the left side). The outer wall 23b (first outer wall) is a ring-shaped surface extending outwardly from the taper face 23a in the radial direction.

Note that, in FIG. 1 and FIG. 2, for the sake of convenience, the insertion member 2 is shown as having no hole or the like that communicates with the outside, but is not limited thereto.

When the insertion member 2 functions as a valve body, for example, to be fitted into the connector portion (the reception member 3) of the hydrogen tank (the tank body 3a) supplying a fuel cell (not shown) with hydrogen, the insertion member 2 is configured as follows. That is, in such a case, the insertion member 2 includes an electromagnetic solenoid valve (not shown); a hydrogen passage (not shown) through which hydrogen is filled into the hydrogen tank from the outside, or is supplied from the hydrogen tank into the fuel cell; and the like <Reception Member>

As shown in FIG. 1, the reception member 3 is formed integrally with the tank body 3a (storage body) for storing a fluid therein, and has a larger-diameter cylindrical portion 31, a smaller-diameter cylindrical portion 32, and a step portion 33. The pressure inside the tank body 3a is higher when the fluid is charged, whereas it is lower when the fluid is discharged. Thus, the so-called alternating pressures are applied to an accommodation region F, which is a region formed when the insertion member 2 is fitted into the reception member 3, because in the accommodation region F, the pressure is higher on the side of the reception member 3 that is integral with the tank body 3a when the fluid is charged, whereas it is higher on the side of the insertion member 2 when the fluid is discharged. The accommodation region F will be described later.

The larger-diameter cylindrical portion 31 (second larger-diameter cylindrical portion) has a cylindrical shape, and has an inner diameter L31 (see FIG. 2). Here, the inner diameter L31 corresponds to the outer diameter L21 of the larger-diameter columnar portion 21 of the insertion member 2 (L31≅L21). Note that the inner diameter L31 of the larger-diameter cylindrical portion 31 is made slightly larger than the outer diameter L21 of the larger-diameter columnar portion 21 in consideration of ease of fitting of the insertion member 2 into the reception member 3, manufacturing errors, and the like. The larger-diameter cylindrical portion 31 has, on an end thereof (one end opposite to the other that faces the insertion member 2 when the insertion member 2 is fitted into the reception member 3), an inner threaded portion 34 for engaging the reception member 3 with the insertion member 2.

The smaller-diameter cylindrical portion 32 (second smaller-diameter cylindrical portion), has a cylindrical shape, is formed integrally with the larger-diameter cylindrical portion 31, and has an inner diameter L32 (see FIG. 2). Here, the inner diameter L32 corresponds to the outer diameter L22 of the smaller-diameter columnar portion 22 of the insertion member 2 (L32≅L22). Note that the inner diameter L32 of the smaller-diameter cylindrical portion 32 is made slightly larger than the outer diameter L22 of the smaller-diameter columnar portion 22 in consideration of ease of fitting of the insertion member 2 into the reception member 3, manufacturing errors, and the like.

Accordingly, there are annular clearances (see the clearances Y1, Y2 in FIG. 5A) respectively between the outer circumferential surface of the larger-diameter columnar portion 21 and the inner circumferential surface of the larger-diameter cylindrical portion 31 and between the outer circumferential surface of the smaller-diameter columnar portion 22 and the inner circumferential surface of the smaller-diameter cylindrical portion 32.

The step portion 33 (second step portion) is located between the larger-diameter cylindrical portion 31 and the smaller-diameter cylindrical portion 32, and is formed due to the difference in diameter therebetween. The step portion 33 has inner surfaces that are respectively a taper face 33a and an inner wall 33b.

The taper face 33a (second taper face) tapers down in the direction of insertion of the insertion member 2 further into the reception member 3 (in FIG. 1, to the left side). The inner wall 33b (second inner wall) is a ring-shaped surface extending inwardly from the taper face 33a in the radial direction.

<O-Ring>

The O-ring 4 takes the shape of a ring, and has a cross section of two rings under no external pressure when taken along the plane including the central axis X as shown in FIG. 1, and is made of a rubber-like elastic material.

The O-ring 4 has an outer diameter L42 (see FIG. 2) slightly larger than the outer diameter L21 of the larger-diameter columnar portion 21 of the insertion member 2 (see FIG. 2). Further, the O-ring 4 has an inner diameter L41 slightly smaller than the outer diameter L22 of the smaller-diameter columnar portion 22 of the insertion member 2 (see FIG. 2).

That is, the difference between the outer diameter L21 of the larger-diameter columnar portion 21 and the outer diameter L22 of the smaller-diameter columnar portion 22 (L21-L22) is smaller than the diameter of each circle in the cross section of the O-ring 4 (L42-L41). With the insertion member 2 fitted in the reception member 3, the O-ring 4 presses the outer circumferential surface of the smaller-diameter columnar portion 22 inwardly in the radial direction while pressing the inner circumferential surface of the larger-diameter cylindrical portion 31 outwardly in the radial direction, resulting in proper sealing of the clearance between the insertion member 2 and the reception member 3.

<First Back-Up Ring>

The first back-up ring 5 is an endless ring, and, as shown in FIG. 2, has a vertical cross section of two trapezoids (when taken along the plane including the central axis X). The first back-up ring 5 has a slant face 51 on the inside thereof (on the side thereof facing the central axis X).

The first back-up ring 5 is made of a material such as a fluorocarbon resin, a polyamide resin, a hard rubber or a light metal. Thus, the first back-up ring 5 is made of a relatively hard material. Note that there is no need for the back-up ring 5 to have a double structure of a hard back-up ring and a soft back-up ring because, as described later, the insertion member 2 can be passed through the hole of the first back-up ring 5 without deforming the first back-up ring 5 for the first back-up ring 5 to be fitted on the insertion member 2.

If the back-up ring 5 is a hard back-up ring with ends, there is a need to provide a soft back-up ring on the O-ring 4 side of the hard back-up ring to prevent the O-ring 4 from being caught in the gap between the ends of the hard back-up ring and damaged. In the present embodiment, in which the first back-up ring 5 can be an endless back-up ring, the configuration of the sealing structure 1 can be simplified and the costs can be reduced.

The same holds true for the second back-up ring 6.

The first back-up ring 5 has an outer diameter L52 which is approximately equal to the outer diameter L21 of the larger-diameter columnar portion 21 of the insertion member 2 and which is also approximately equal to the inner diameter L31 of the larger-diameter cylindrical portion 31 of the reception member 3 (see FIG. 2). Further, the annular slant face 51 of the first back-up ring 5 defines a circle of a diameter L51 at an edge thereof closest to the central axis X. The diameter L51 is approximately equal to the outer diameter L22 of the smaller-diameter columnar portion 22 of the insertion member 2.

The first back-up ring 5 has, on the insertion member 2 side (in FIG. 2, on the right side), a ring-shaped surface with a length L53 (see FIG. 2) in the radial direction which is larger than a length L23 in the radial direction of the outer wall 23b of the insertion member 2.

Owing to this structure, when the insertion member 2 is being fitted into the reception member 3, the first back-up ring 5 abuts on the taper face 23a of the insertion member 2 before the ring-shaped surface thereof on the insertion member 2 side comes into contact with the outer wall 23b of the insertion member 2. This results in the formation of a clearance between the end on the insertion member 2 side of the first back-up ring 5 and the outer wall 23b of the insertion member 2 (see a distance L72 in FIG. 5A).

The surface of the first back-up ring 5 opposed to the outer surfaces of the step portion 23 of the insertion member 2 is formed to come in total contact with the outer surfaces of the step portion 23.

That is, the ring-shaped surface on the insertion member 2 side (in FIG. 2, on the right side) of the first back-up ring 5 forms an angle $\Theta5$ (see FIG. 5A) relative to the slant face 51 (see FIG. 2) thereof, whereas the taper face 23a forms an angle $\Theta2$ relative to the smaller-diameter columnar portion 22 of the insertion member 2, the sum of the angle $\Theta5$ and the angle $\Theta2$ being 90° ($\Theta2+\Theta5=90°$).

Owing to this structure, with the insertion member 2 fitted in the reception member 3, when the pressure becomes higher inside the storage body 3a, the first back-up ring 5 presses the O-ring 4 inwardly, to prevent the O-ring 4 from being displaced and deformed toward the outer circumferential surface of the insertion member 2 or toward the inner circumferential surface of the reception member 3.

The same holds true for the relationship between the outer surfaces of the step portion 33 of the reception member 3 and the surfaces of the second back-up ring 6 opposed thereto.

<Second Back-Up Ring>

The second back-up ring 6 is an endless ring, and, as shown in FIG. 2, is shown as two trapezoids in vertical cross section. The second back-up ring 6 has a slant face 61 on the outside thereof (on the side thereof away from the central axis X). The second back-up ring 6, like the first back-up ring 5, is made of a relatively hard material such as a polyamide resin.

The annular slant face 61 of the second back-up ring 6 (see FIG. 2) defines a circle of a diameter L62 at an edge thereof most distant from the central axis X. The diameter L62 is approximately equal to the inner diameter L31 of the larger-diameter cylindrical portion 31 of the reception member 3. The second back-up ring 6 has an inner diameter L61 which is approximately equal to the inner diameter L32 of the smaller-diameter cylindrical portion 32 of the reception member 3 and which is also approximately equal to the outer diameter L22 of the smaller-diameter columnar portion 22 of the insertion member 2.

The second back-up ring 6 has, on the reception member 3 side (in FIG. 2, on the left side), a ring-shaped surface with a length L63 (see FIG. 2) in the radial direction which is larger than a length L33 in the radial direction of the outer wall 33b of the reception member 3.

Owing to this structure, when the insertion member 2 is fitted into the reception member 3, the second back-up ring 6 abuts on the taper face 33a of the reception member 3 before the ring-shaped surface thereof on the reception member 3 side comes into contact with the outer wall 33b of the reception member 3. This results in the formation of a clearance between the end on the reception member 3 side of the second back-up ring 6 and the outer wall 33b of the reception member 3 (see a distance L71 in FIG. 5A).

The surface of the second back-up ring 6 opposed to the inner surfaces of the step portion 33 of the reception member 3 is formed to come in total contact with the inner surfaces of the step portion 33.

That is, the ring-shaped surface on the reception member 3 side (in FIG. 2, on the left side) of the second back-up ring 6 forms an angle $\Theta6$ (see FIG. 5A) relative to the slant face 61 (see FIG. 2) thereof, whereas the taper face 33a forms an angle $\Theta3$ relative to the larger-diameter cylindrical portion 31 of the reception member 3, with the sum of the angle $\Theta6$ and the angle $\Theta3$ being 90° ($\Theta3+\Theta6=90°$).

Figure 5A:
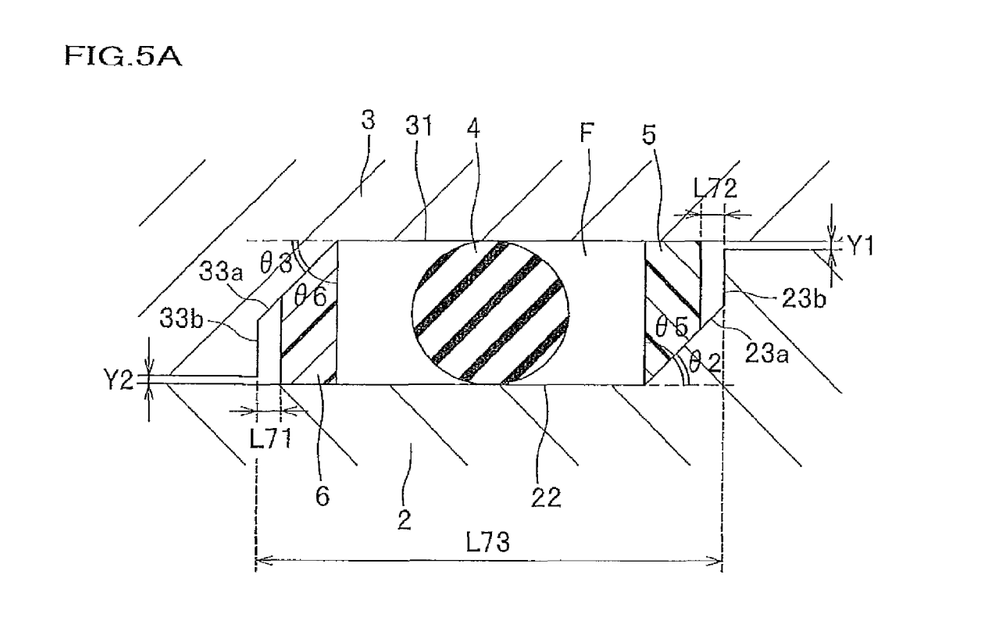
FIG. 5A is a partially enlarged view of a region T shown in FIG. 4B.

As long as the above conditions are satisfied, the angles $\Theta5$ and $\Theta6$ of FIG. 5A may be the same or different. For example, the angle $\Theta5=45°$ (in this case, $\Theta2=(90°-\Theta5)=45°$) and the angle $\Theta6=60°$ (in this case, $\Theta3=(90°-\Theta6)=30°$).

<<Procedure of Fitting Insertion Member into Reception Member>>

(1. Placement of O-Ring and Back-Up Rings)

Before the insertion member 2 is inserted into the reception member 3, the insertion member 2 is passed through the hole of the first back-up ring 5 as shown in FIG. 3 to make the slant face 51 of the first back-up ring 5 (see FIG. 2) abut on the taper face 23a of the insertion member 2 (see FIG. 2). At this time, as described above, there is a clearance between the surface on the insertion member 2 side of the first back-up ring 5 and the outer wall 23b of the insertion member 2 (see the distance L72 in FIG. 5A)

Further, as described above, the sum of the angles $\Theta2$ and $\Theta5$ of FIG. 5A is 90°. Accordingly, when the slant face 51 of the first back-up ring 5 is in abutment on the taper face 23a of the insertion member 2, the surface on the insertion member 2 side of the first back-up ring 5 and the surface on the reception member 3 side thereof are parallel to the outer wall 23b of the insertion member 2.

Next, the insertion member 2 is passed through the hole of the O-ring 4. As described above, the inner diameter L41 of the O-ring 4 is slightly smaller than the outer diameter L22 of the smaller-diameter columnar portion 22 of the insertion member 2 (see FIG. 2). Accordingly, when the O-ring 4 is fitted on the insertion member 2 (see FIG. 3), the O-ring 4 presses the outer circumferential surface of the smaller-diameter columnar portion 22 inwardly in the radial direction, to fit the O-ring 4 itself in the insertion member 2 and also prevent the first back-up ring 5 from coming off the insertion member 2.

Note that in the above, it is said that the slant face 51 of the first back-up ring 5 is made to abut on the taper face 23a of the insertion member 2, but this is not necessarily the case because even if the slant face 51 of the first back-up ring 5 is spaced apart from the taper face 23a of the insertion member 2, the first back-up ring 5 is pushed by the O-ring 4 when the insertion member 2 is inserted into the reception member 3 to make the slant face 51 abut on the taper face 23a.

On the other hand, as shown in FIG. 3, the second back-up ring 6 is fitted into the reception member 3. That is, the second back-up ring 6 is moved to make the slant face 61 thereof (see FIG. 2) abut on the taper face 33a of the reception member 3 (see FIG. 2). At this time, as described above, there is a clearance between the surface on the reception member 3 side of the second back-up ring 6 and the outer wall 33b of the reception member 3 (see the distance L71 in FIG. 5A).

Further, as described above, the sum of the angles Θ3 and Θ6 of FIG. 5A is 90°. Accordingly, when the slant face 61 of the second back-up ring 6 is in abutment on the taper face 33a of the reception member 3, the surface on the insertion member 2 side of the second back-up ring 6 and the surface on the reception member 3 side thereof are parallel to the inner wall 33b of the reception member 3.

(2. Insertion of Insertion Member into Reception Member)

As described above, the outer diameter L22 of the smaller-diameter columnar portion 22 of the insertion member 2 (see FIG. 2) is smaller than the inner diameter L31 of the larger-diameter cylindrical portion 31 of the reception member 3 (see FIG. 2). This provides an allowance of a distance in the radial direction between the insertion member 2 and the reception member 3 (L31-L22) when the smaller-diameter columnar portion 22 of the insertion member 2 enters the space defined by the inner circumferential surface of the larger-diameter cylindrical portion 31 of the reception member 3, as shown in FIG. 3.

Namely, in the state shown in FIG. 3, even if the insertion member 2 is more or less positionally displaced or shifted from the reception member 3 with their central axes misaligned with each other, there is only an extremely small risk that the insertion member 2 will collide with the reception member 3. Namely, there is only an extremely small risk of damage to the outer circumferential surface of the smaller-diameter columnar portion 22 of the insertion member 2 and to the inner circumferential surface of the larger-diameter cylindrical portion 31 of the reception member 3.

Figure 4A:
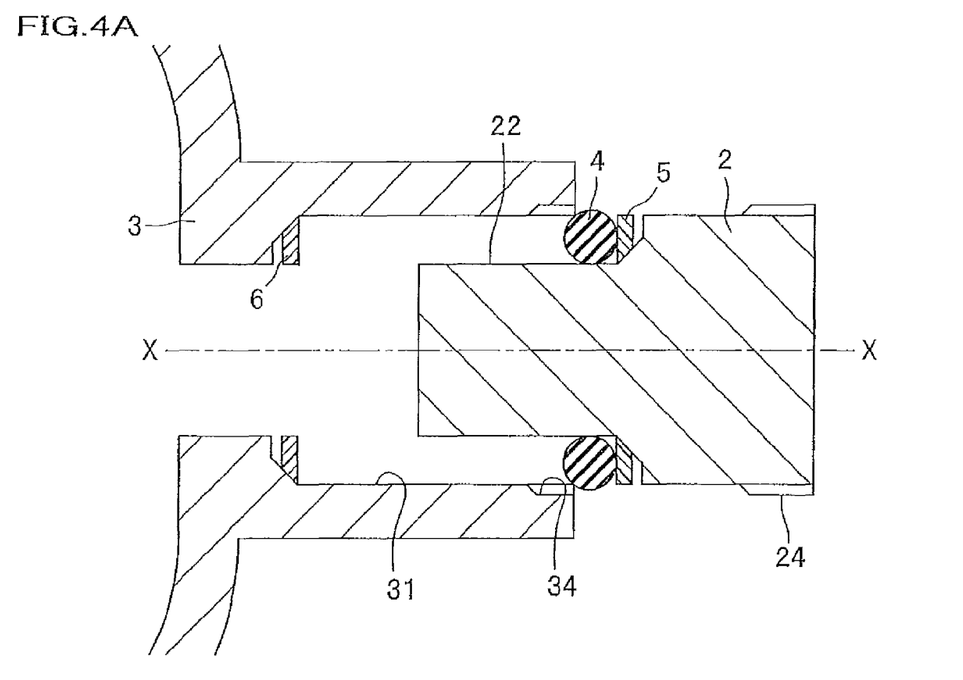
FIG. 4A shows a state in which an O-ring fitted on the insertion member is in contact with an edge of the larger-diameter cylindrical portion of the reception member.

Then, from the state shown in FIG. 3, the insertion member 2 is inserted further into the reception member 3, to the state shown in FIG. 4A. As described above, the outer diameter L42 of the O-ring 4 is only slightly larger than the inner diameter L31 of the larger-diameter cylindrical portion 31 of the reception member 3 (see FIG. 2). Thus, as shown in FIG. 4A, the O-ring 4 on the insertion member 2 contacts the edge of the larger-diameter cylindrical portion 31 of the reception member 3.

As described above, the difference (L21-L22) between the outer diameter L21 of the larger-diameter columnar portion 21 and the outer diameter L22 of the smaller-diameter columnar portion 22 is smaller than the diameter of the circle in the cross section of the O-ring 4 (L42-L41) (see FIG. 2).

Accordingly, when the insertion member 2 is inserted further into the reception member 3 from the state shown in FIG. 4A, the O-ring 4 is elastically deformed by being pressed into the gap between the outer circumferential surface of the smaller-diameter columnar portion 22 of the insertion member 2 and the inner circumferential surface of the larger-diameter cylindrical portion 31 of the reception member 3. At this time, the magnitudes of the forces by which the outer circumferential surface of the smaller-diameter columnar portion 22 of the insertion member 2 presses the O-ring in the outward radial directions of the O-ring 4 are uniform throughout the annular contact surface of the O-ring 4 with the smaller-diameter columnar portion 22. Likewise, the magnitudes of the forces by which the inner circumferential surface of the larger-diameter cylindrical portion 31 of the reception member 3 presses the O-ring 4 in inward radial directions of the O-ring 4 are uniform throughout the annular contact surface of the O-ring 4 with the larger-diameter cylindrical portion 31.

Accordingly, when the insertion member 2 is inserted further into the reception member 3 from the state shown in FIG. 4A, the O-ring 4 is used as a guide to make it difficult for the central axis of the insertion member 2 to be misaligned with that of the reception member 3.

Note that, as shown in FIG. 3, the sum of the length L24 in the axial direction of the smaller-diameter columnar portion 22 and the length L25 in the axial direction of the step portion 23 (L24+L25) is preferably smaller than the sum of the length L34 in the axial direction of the larger-diameter cylindrical portion 31 and the length L35 in the axial direction of the step portion 33 (L34+L35).

In such a case, the end on the reception member 3 side of the larger-diameter columnar portion 21 (see FIG. 2) enters the space defined by the inner circumferential surface of the larger-diameter cylindrical portion 31 before the end of the smaller-diameter columnar portion 22 of the insertion member 2 reaches the end on the insertion member 2 side of the smaller-diameter cylindrical portion 32 of the reception member 3.

Here, as described above, the outer diameter L21 of the larger-diameter columnar portion 21 of the insertion member 2 is approximately equal to the inner diameter L31 of the larger-diameter cylindrical portion 31 of the reception member 3. The insertion member 2 is inserted into the reception member 3 with the aid of the O-ring 4 that serves as a guide by traveling through the gap between the smaller-diameter columnar portion 22 of the insertion member 2 and the larger-diameter cylindrical portion 31 of the reception member 3. Then, as described above, when the end on the reception member 3 side of the larger-diameter columnar portion 21 (see FIG. 2) enters the space defined by the inner circumferential surface of the larger-diameter cylindrical portion 31, the central axis of the insertion member 2 is approximately aligned with that of the reception member 3.

The insertion member 2 is inserted further into the reception member 3 while being centered in relation thereto with the central axis of the insertion member 2 approximately aligned with that of the reception member 3 as described above until the end of the smaller-diameter columnar portion 22 of the insertion member 2 enters the space defined by the smaller-diameter cylindrical portion 32 of the reception member 3. At this time, because the insertion member 2 is centered in relation to the reception member 3 as described above, the insertion member 2 can be fitted smoothly into the reception member 3 without the outer circumferential surface of the smaller-diameter columnar portion 22 damaging the inner circumferential surface of the smaller-diameter cylindrical portion 32.

Figure 4B:
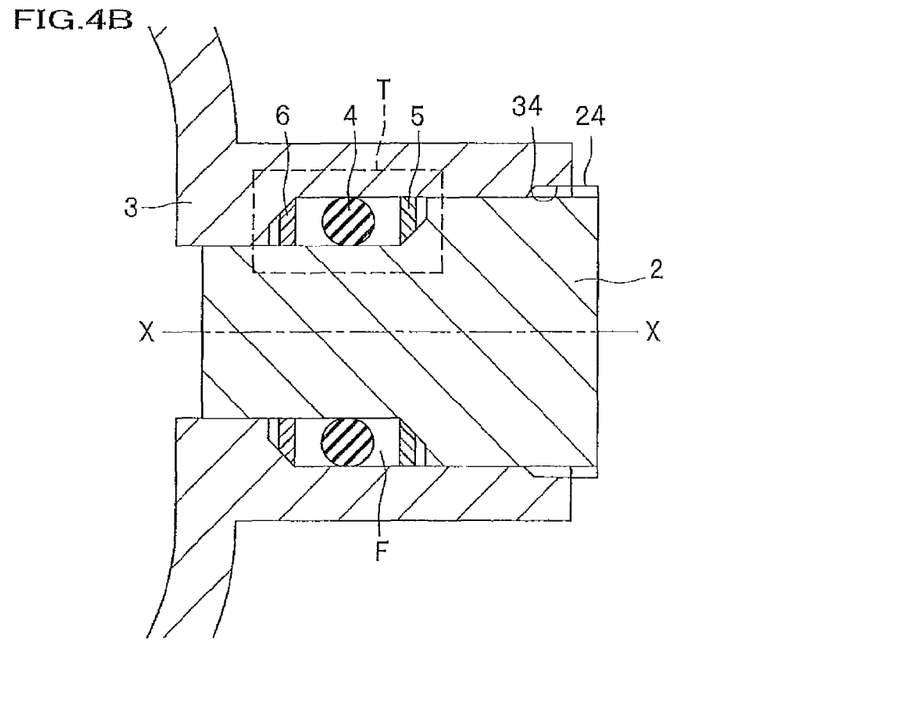
FIG. 4B shows a state in which the insertion member is fitted in the reception member.

Then, the outer threaded portion 24 of the larger-diameter columnar portion 21 of the insertion member 2 is engaged with the inner threaded portion 34 of the larger-diameter cylindrical portion 31 of the reception member 3 to fit the insertion member 2 in the reception member 3 as in the state shown in FIG. 4B.

As shown in FIG. 4B, with the insertion member 2 fitted in the reception member 3, the accommodation region F for accommodating the O-ring 4 is defined by the outer circumferential surface of the smaller-diameter columnar portion 22, the outer surfaces of the step portion 23, the inner circumferential surface of the larger-diameter cylindrical portion 31, and the inner surfaces of the step portion 33. Inside the accommodation region F, the O-ring 4 is located between the first back-up ring 5 and the second back-up ring 6.

<<Filling Percentage of O-Ring>>

FIG. 5A is a partially enlarged view of a region T shown in FIG. 4B.

The filling ratio α of the O-ring 4 [%] is determined by the following equation (1), wherein: S1 (see FIG. 5A) is an area of the cross section of the accommodation region F taken along the plane including the central axis X with the insertion member 2 inserted in the reception member 3; S5 is an area of each of the two trapezoids in the cross section of the first back-up ring 5; S6 is an area of each of the two trapezoids in the cross section of the second back-up ring 6; and R is a radius of each of the two circles in the cross section of the O-ring 4 taken along the plane including the central axis X when not pressed from the outside.

$$\alpha = (\pi R^2 / (S1 - S5 - S6)) \times 100 \qquad \text{equation (1)}$$

In the sealing structure 1 according to the present embodiment, the area ($\pi R^2$) of the cross section of the O-ring 4 taken along the plane including the central axis X, the area S5 of the cross section of the first back-up ring 5, the area S6 of the cross section of the second back-up ring 6, the outer diameter L22 of the first smaller-diameter columnar portion 22, the inner diameter L31 of the second larger-diameter cylindrical portion 31, a length L73 (see FIG. 5A) in the axial direction of the accommodation region F are set so that the filling ratio α of the O-ring 4 is set to not lower than a predetermined value (for example, 60%).

<<Functions of O-Ring and Back-Up Rings>>

As shown in FIG. 5A, there are small annular clearances Y1, Y2 between the outer circumferential surface of the larger-diameter columnar portion 21 and the inner circumferential surface of the larger-diameter cylindrical portion 31 and between the outer circumferential surface of the smaller-diameter columnar portion 22 and the inner circumferential surface of the smaller-diameter cylindrical portion 32.

Further, as shown in FIG. 5A, the surface on the insertion member 2 side of the first back-up ring 5 is spaced apart from the outer wall 23b of the insertion member 2 by the distance L72, whereas the surface on the reception member 3 side of the second back-up ring 6 is spaced apart from the inner wall 33b of the reception member 3 by the distance L71.

As mentioned above, the sum of the angles Θ2 and Θ5 and the sum of the angles Θ3 and Θ6 of FIG. 5A are each 90°.

Figure 5B:
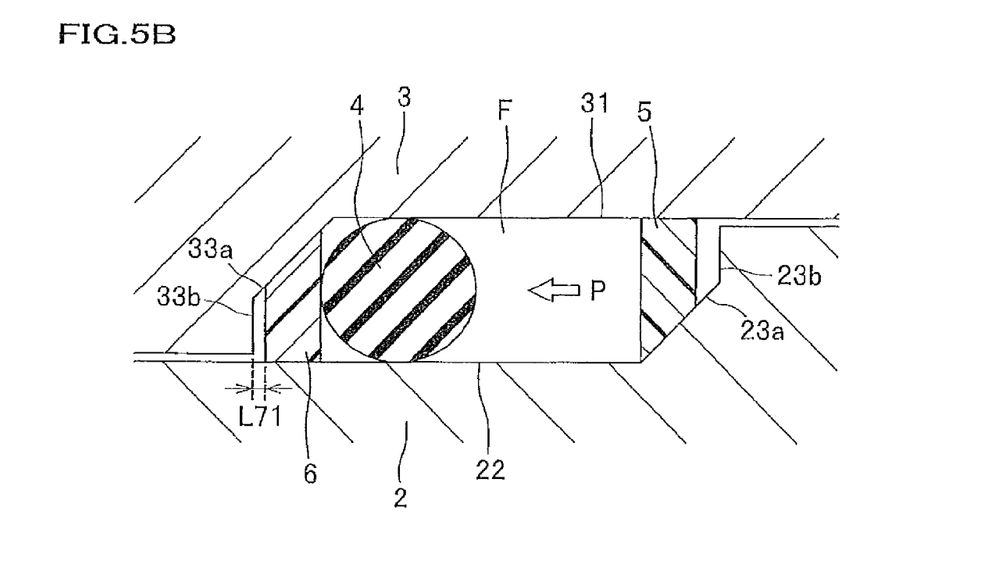
FIG. 5B is a partially enlarged view of the region T in a state in which a pressure is applied from the insertion member side.

For example, as shown in FIG. 5B, when the pressure inside the storage body 3a becomes lower and a pressure P is applied to the inside of the storage body 3a from the insertion member 2 side, the O-ring 4 is moved from the insertion member 2 side where the pressure is higher to the reception member 3 side where it is lower. The O-ring is brought into contact with the surface on the O-ring 4 side of the second back-up ring 6. Further, when the second back-up ring 6 is pressed by the O-ring 4, the second back-up ring 6 is moved toward the reception member 3 side (where the pressure is low) by a predetermined amount according to the magnitude of the pressure. The movement of the second back-up ring 6 is restricted by the shape of the taper face 33a (shape slant to have a diameter gradually decreasing toward the direction in which the insertion member 2 is fitted into the reception member 3).

Namely, the slant face 61 of the second back-up ring 6 (see FIG. 2) is pressed by the taper face 33a inwardly in the radial direction while the inner surface of the second back-up ring 6 is pressed by the outer circumferential surface of the smaller-diameter columnar portion 22 outwardly in the radial direction. Accordingly, the second back-up ring 6 makes close contact with each of the outer circumferential surface of the smaller-diameter columnar portion 22 and the taper face 33a.

In the above, description has been made of the case in which the pressure P is applied from the insertion member 2 side. When the pressure inside the storage body 3a becomes higher and the pressure is applied from the reception member 3 side, on the other hand, the first back-up ring 5 is moved toward the insertion member 2 side (where the pressure is lower) according to the magnitude of the pressure. The description of this case that will be the same as the above will be omitted.

<<Effects>>

According to the sealing structure 1 of the present embodiment, the following effects can be obtained.

That is, the inner diameter of the larger-diameter cylindrical portion 31 of the reception member 3 is larger than the outer diameter of the smaller-diameter columnar portion 22 of the insertion member 2. Accordingly, the insertion member 2 can be inserted easily into the reception member 3 without the smaller-diameter columnar portion 22 of the insertion member 2 contacting (damaging) the larger-diameter cylindrical portion 31 of the reception member 3.

When from the above state, the insertion member 2 is inserted further into the reception member 3, the edge of the larger-diameter cylindrical portion 31 of the reception member 3 hits the O-ring 4 fitted on the insertion member 2. The O-ring 4 that is made of an elastic material does not damage the edge of and the inner circumferential surface of the larger-diameter cylindrical portion 31 of the reception member 3 even if hitting these.

Then, when from the above state, the insertion member 2 is inserted further into the reception member 3, the O-ring 4 is elastically deformed by being pressed into the gap between the outer circumferential surface of the smaller-diameter columnar portion 22 and the inner circumferential surface of the larger-diameter cylindrical portion 31, to serve as a guide when the insertion member 2 is inserted into the reception member 3. Accordingly, it is possible to easily fit the insertion member 2 into the reception member 3 with their central axes aligned with each other and prevent damage to the insertion member 2 and the reception member 3.

Further, with the insertion member fitted in the reception member 3, the accommodation region F is formed. The accommodation region F has inside it the first and second back-up rings 5, 6 arranged in parallel to each other with the O-ring 4 sandwiched therebetween. Thus, even when alternating pressures are applied to the accommodation region F, the O-ring 4 can be protected properly to ensure improved sealing performances.

The surface of the first back-up ring 5 opposed to the outer surfaces of the step portion 23 is formed to come in total contact with the outer surfaces of the step portion 23. Accordingly, the first back-up ring 5 makes close contact with the step portion 23 when the pressure inside the accommodation region F becomes higher on the reception member 3 side. Likewise, the surface of the second back-up ring 6 opposed to the inner surfaces of the step portion 33 is formed to come in total contact with the inner surfaces of the step portion 33. Accordingly, the second back-up ring 6 makes close contact with the step portion 33 when the pressure inside the accommodation region F becomes higher on the insertion member 2 side. Consequently, even when alternating pressures are applied, the O-ring 4 is prevented from being caught in the clearances Y1, Y2 between the insertion member 2 and the reception member 3. Namely, damage to the O-ring 4 can be prevented to ensure more proper sealing against fluid leakage.

Moreover, for example, when the pressure inside the accommodation region F becomes higher on the reception member 3 side, the first back-up ring 5 is deformed along the taper face 23a, presses the taper face 23a inwardly in the radial direction and presses the inner circumferential surface of the larger-diameter cylindrical portion 31 outwardly in the radial direction. Accordingly, the first back-up ring 5 seals the clearance between the first back-up ring 5 and the outer circumferential surface of the insertion member 2 and the clearance between the first back-up ring 5 and the inner circumferential surface of the reception member 3. Consequently, the O-ring can be prevented from being caught in the clearance and damaged to ensure more proper sealing against fluid leakage.

The same holds true for the effects of the second back-up ring in the case in which the pressure is high on the insertion member 2 side.

Further, the surface on the insertion member 2 side of the first back-up ring 5 is spaced apart from the outer wall 23b by the predetermined distance. Accordingly, when the pressure is applied from the reception member 3 side (where the pressure is higher), the first back-up ring 5 is moved toward the insertion member 2 side (where the pressure is lower) according to the magnitude of the pressure. The movement of the first back-up ring 5 is restricted by the shape of the taper face 23a while the first back-up ring 5 makes close contact with each of the taper face 23a and the inner circumferential surface of the larger-diameter cylindrical portion 31 to ensure improved sealing performances. The same holds true for the second back-up ring 6.

Further, when the insertion member 2 is passed through the hole of the first back-up ring 5 for the first back-up ring 5 to be fitted on the insertion member 2, the first back-up ring 5 is moved along the outer circumferential surface of the insertion member 2 of the smaller-diameter columnar portion 22 to reach the taper face 23a. The same holds true for how to fit the O-ring 4. Further, when the second back-up ring 6 is fitted on the reception member 3, the second back-up ring 6 is moved along the inner circumferential surface of the reception member 3 of the larger-diameter cylindrical portion 31 to reach the taper face 33a.

Therefore, according to the sealing structure 1 of the present embodiment, the O-ring 4 and the first and second back-up rings 5, 6 can be fitted easily. Further, the first and second back-up rings 5, 6 do not need to be back-up rings with ends for ease of fitting, and can be endless back-up rings.

If a back-up ring with ends is used for sealing a high-pressure gas, it is necessary to use a back-up ring with a double-structure of a hard back-up ring with ends and a soft back-up ring with ends to prevent gas leakage from the ends and prevent damage to the O-ring 4. This results in a complicated sealing structure and increased costs.

On the other hand, according to the sealing structure 1 of the present embodiment, the first and second back-up rings 5, 6 can be endless back-up rings, as described above, and are not required to have a double structure. Accordingly, high sealing performances can be exhibited with a simple structure, which reduces manufacturing costs of the sealing structure.

Further, in the sealing structure 1 according to the present embodiment, the filling ratio α of the O-ring 4 is set to not lower than a predetermined value (for example, 60%). Accordingly, even if an O-ring with a relatively high gas permeation coefficient is used, only a reduced amount of the permeated gas is allowed to stay in a space between the O-ring 4 and the first back-up ring 5 or a space between the O-ring 4 and the second back-up ring 6. Namely, the O-ring 4 prevented from being moved by the pressure of the permeated gas and pressed against either one of the first and second back-up rings on the lower pressure side, and damaged.

Further, an amount of the O-ring 4 to be deformed due to a change in pressure can be reduced, the elasticity of the O-ring 4 required for sealing can be retained sufficiently, and the life of the O-ring 4 can be prolonged.

Moreover, by setting the filling ratio α of the O-ring 4 to not lower than the predetermined value, the application range of materials for the O-rings can be broadened.

Further, the O-ring 4 with a filling ratio α of not lower than the predetermined value possesses a sufficient force to return to its initial shape (see FIG. 1) with the insertion member 2 fitted in the reception member 3. Accordingly, the first and second back-up rings 5, 6 each do not need to be a soft back-up ring to serve as a cushion but can be a relatively hard back-up ring.

The first and second back-up rings 5, 6 that are made of a hard material make close contact with the tapers 23a, 33a, respectively, while sliding thereon in association with application of a pressure to the accommodation region F (see FIG. 5B), which ensures prevention of fluid leakage from the clearances Y1, Y2 (see FIG. 5A).

<<Modifications>>

Description has been made of the sealing structure according to an embodiment of the present invention. However, the sealing structure according to the invention is not limited thereto, and various modifications can be made.

Figure 6A:
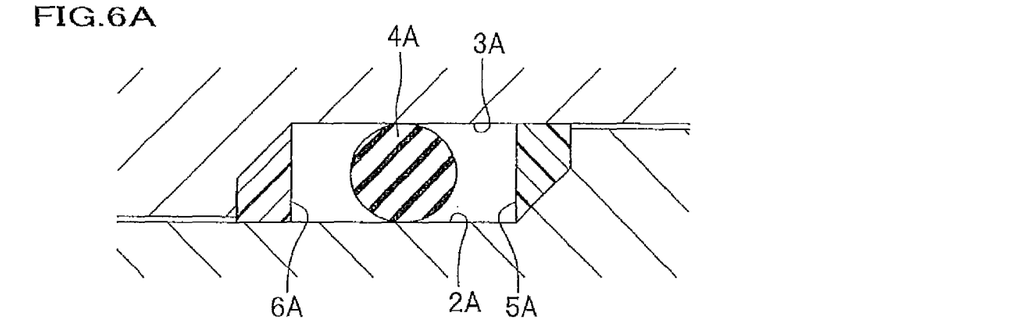
FIG. 6A shows a configuration of the region T with back-up rings shown as trapezoids in cross section and making close contact with the insertion member and the reception member respectively.

For example, as shown in FIG. 6A, the sealing structure 1 may be configured so that there is no clearance either between the surface on a insertion member 2A side of a first back-up ring 5A and the outer wall 23b (see FIG. 2) or between the surface of a reception member 3A side of a second back-up ring 6A and the inner wall 33b (see FIG. 2).

Figure 6B:
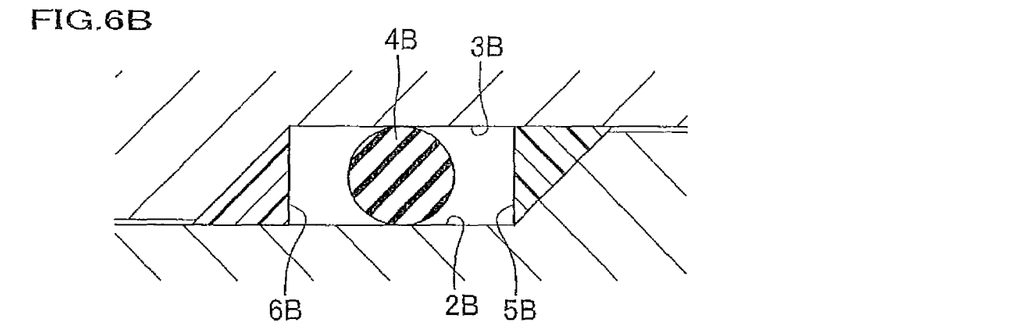
FIG. 6B shows a configuration of the region T with back-up rings shown as triangles in cross section.

Further, as shown in FIG. 6B, the sealing structure 1 may be configured so that a first back-up ring 5B and a second back-up ring 6B are shown as right triangles in cross section with the hypotenuses thereof in abutment on the taper of the insertion member 2 and the taper of the reception member 3.

Figure 6C:
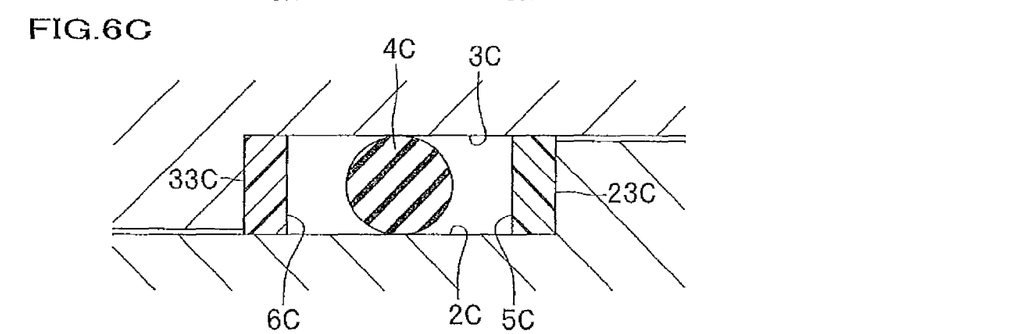
FIG. 6C shows a configuration of the region T with back-up rings shown as rectangles in cross section.

Further, as shown in FIG. 6C, the sealing structure 1 may be configured so that the insertion member 2 and the reception member 3 have no tapers but they include step faces 23C, 33C extending in parallel to a plane perpendicular to the central axis X, and so that the sealing structure 1 includes a first back-up ring 5C and a second back-up ring 6C that have rectangular cross sections and that make contact with the step faces 23C, 33C, respectively.

Even if the sealing structure 1 is configured as shown in each of FIGS. 6A-6C, it is possible to fit easily the insertion member 2 into the reception member 3 and prevent damage to the insertion member 2 and the reception member 3. Further, because there are two back-up rings arranged in parallel to each other with the O-ring 4 sandwiched therebetween, a proper sealing is ensured even with application of alternating pressures to prevent damage to the O-ring 4.

Figure 6D:
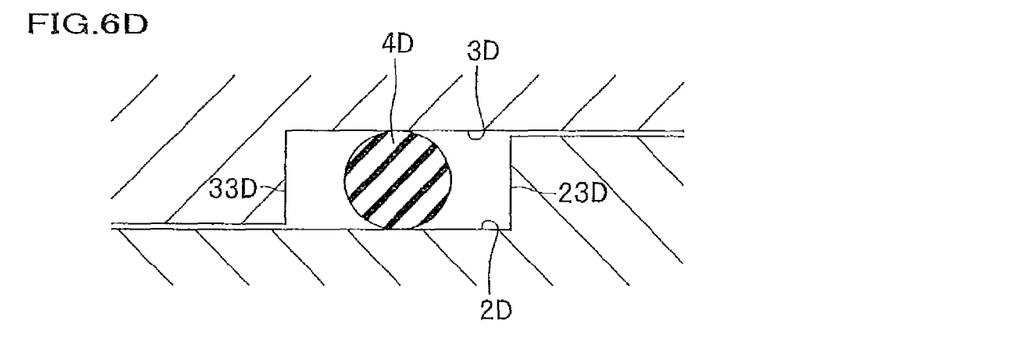
FIG. 6D shows a configuration of the region T with no back-up rings but only an O-ring.

Moreover, as shown in FIG. 6D, the sealing structure 1 may be configured so that the insertion member 2 and the reception member 3 have no tapers but respectively include step faces 23D, 33D extending in parallel to a plane perpendicular to the central axis X, and so that the sealing structure 1 includes the O-ring 4 but no back-up rings. Even if the sealing structure 1 is configured as shown in FIG. 6D, it is possible to fit easily the insertion member 2 into the reception member 3 and prevent damage to the insertion member 2 and the reception member 3.

A proper choice can be made between the configurations of the sealing structures shown in FIG. 5A, FIGS. 6A-6D in consideration of the magnitude of the pressure applied to the accommodation region F, or the like.

Moreover, each of the above configurations of the sealing structure 1, in which it is possible to seal the annular clearance between the insertion member 2 and the reception member 3 and thus prevent leakage of the fluid (liquid or gas), is applicable to various apparatus. Further, each of the above configurations of the sealing structure 1 is applicable not only in the case where the relation in magnitude between the pressure from the insertion member 2 side and the pressure from the reception member 3 side are changed with time (namely, alternating pressures are applied) but also in the case where the pressure is always high on either one of the insertion member 2 side and the reception member 3 side.

What is claimed is:

1. A sealing structure comprising:
   an insertion member having a columnar outer shape;
   a reception member having a cylindrical shape for receiving the insertion member, the reception member being formed integrally with a storage body for storing a fluid therein; and
   an O-ring disposed between the insertion member and the reception member for sealing a fluid in the storage body, wherein:
      the insertion member includes a first larger-diameter columnar portion, a first smaller-diameter columnar portion, and a first step portion, the first smaller-diameter columnar portion being formed integrally with the first larger-diameter columnar portion and having an outer diameter smaller than an outer diameter of the first larger-diameter columnar portion, the first step portion being formed by a difference in diameter between the first larger-diameter columnar portion and the first smaller-diameter columnar portion,
      the reception member includes a second larger-diameter cylindrical portion, a second smaller-diameter cylindrical portion, and a second step portion, the second larger-diameter cylindrical portion having an inner diameter corresponding to the outer diameter of the first larger-diameter columnar portion, the second smaller-diameter cylindrical portion being formed integrally with the second larger-diameter cylindrical portion and having an inner diameter corresponding to the outer diameter of the first smaller-diameter columnar portion, the second step portion being formed by a difference in diameter between the second larger-diameter cylindrical portion and the second smaller-diameter cylindrical portion, and
      when the insertion member is fitted into and aligned coaxially with the reception member after an end of the first smaller-diameter columnar portion of the insertion member is kept opposed to an end of the second larger-diameter cylindrical portion of the reception member,
      an accommodation region for accommodating the O-ring is formed by an outer circumferential surface of the first smaller-diameter columnar portion, an outer surface of the first step portion, an inner circumferential surface of the second larger-diameter cylindrical portion, and an inner surface of the second step portion,
   the sealing structure further comprising:
      a first back-up ring disposed on a side of the insertion member inside the accommodation region for restricting movement of the O-ring in an axial direction of the accommodation region; and
      a second back-up ring disposed on a side of the reception member inside the accommodation region for restricting movement of the O-ring in the axial direction of the accommodation region,
   wherein:
      the first back-up ring has a surface opposed to the outer surface of the first step portion and formed to come in total contact with the outer surface of the first step portion, and
      the second back-up ring has a surface opposed to the inner surface of the second step portion and formed to come in total contact with the inner surface of the second step portion,
   wherein:
      the outer surface of the first step portion comprises a first taper face tapering down toward an inside of the storage body,
      the inner surface of the second step portion comprises a second taper face tapering down away from the inside of the storage body,
      the first step portion includes a first outer wall extending from the first taper face outwardly in the radial direction,
      the second step portion includes a second inner wall extending from the second taper face inwardly in the radial direction,
      when the insertion member is fitted coaxially into the reception member, clearances are formed respectively between the first back-up ring and the first outer wall and between the second back-up ring and the second inner wall,
      the first back-up ring has an outer circumferential surface which is parallel to the inner circumferential surface of the second larger-diameter cylindrical portion of the reception member when viewed in a vertical cross sectional view,
   the first back-up ring having an outer diameter approximately equal to the inner diameter of the second larger-diameter cylindrical portion, and
      the second back-up ring has an inner circumferential surface which is parallel to the outer circumferential surface of the first smaller-diameter columnar portion of the insertion member when viewed in a vertical cross sectional view, the second back-up ring having an inner diameter approximately equal to the outer diameter of the first smaller-diameter columnar portion,
   wherein:
      respective cross sectional areas of the O-ring, the first back-up ring and the second back-up ring taken along a plane including an axis that the insertion member and the reception member have in common when these members are coaxially fitted with each other, the outer diameter of the first smaller-diameter columnar portion, the inner diameter of the second larger-diameter cylindrical portion, and a length in the axial direction of the accommodation region are set so that a filling ratio of the O-ring in the accommodation region is not lower than a predetermined value, and wherein:

the filling ratio of the O-ring in the accommodation region is such a predetermined value that a space is formed between the first back-up ring and the second back-up ring, wherein in the space the O-ring is able to move in response to pressure changes in an axial direction to any of the first back-up ring and the second back-up ring and abut either of the first back-up ring or the second back-up ring.

2. The sealing structure of claim 1, wherein the first taper face is parallel to the second taper face when the insertion member is fitted in the reception member.

3. The sealing structure of claim 1, wherein the second step portion is formed integrally with the second larger-diameter cylindrical portion.

* * * * *